US012613436B2

(12) United States Patent
    Glickfield

(10) Patent No.:    US 12,613,436 B2
(45) Date of Patent:    Apr. 28, 2026

(54) PAIR OF GLASSES WITH INTEGRATED COMPUTING DEVICE

(71) Applicant: ASG Products, LLC, Miami Beach, FL (US)

(72) Inventor: Adam S Glickfield, Miami Beach, FL (US)

(73) Assignee: ASG Products, LLC, Miami Beach, FL (US)

( * ) Notice: Subject to any disclaimer, the term of this patent is extended or adjusted under 35 U.S.C. 154(b) by 247 days.

(21) Appl. No.: 18/352,684

(22) Filed: Jul. 14, 2023

(65) Prior Publication Data

US 2024/0019718 A1     Jan. 18, 2024

Related U.S. Application Data

(63) Continuation-in-part of application No. 29/848,572, filed on Aug. 3, 2022, now Pat. No. Des. 1,020,747, and a continuation-in-part of application No. 29/848,575, filed on Aug. 3, 2022, now Pat. No. Des. 1,098,242.

(60) Provisional application No. 63/368,465, filed on Jul. 14, 2022.

(51) Int. Cl.
    *G02C 11/00*      (2006.01)
    *G02C 11/06*      (2006.01)

(52) U.S. Cl.
    CPC .............. *G02C 11/10* (2013.01); *G02C 11/06* (2013.01)

(58) Field of Classification Search
    CPC .......... G02C 11/10; G02C 11/06; G02C 7/101
    USPC ......................................................... 351/158
    See application file for complete search history.

(56) References Cited

U.S. PATENT DOCUMENTS

| | | | |
|---|---|---|---|
| 5,438,024 A | 8/1995 | Bolton | |
| 9,470,909 B2 * | 10/2016 | Willey | G02C 11/10 |
| 10,627,633 B2 | 4/2020 | Liao | |
| 2007/0109491 A1 * | 5/2007 | Howell | A61B 5/02433 |
| | | | 351/41 |
| 2009/0116098 A1 | 5/2009 | Chang | |
| 2011/0231757 A1 * | 9/2011 | Haddick | H04N 23/55 |
| | | | 715/702 |
| 2012/0127423 A1 * | 5/2012 | Blum | G02C 7/083 |
| | | | 351/158 |
| 2013/0215374 A1 * | 8/2013 | Blum | G02C 7/081 |
| | | | 351/158 |
| 2015/0248026 A1 * | 9/2015 | Willey | H01R 35/04 |
| | | | 351/158 |
| 2019/0188471 A1 * | 6/2019 | Osterhout | G06F 3/012 |
| 2019/0369402 A1 * | 12/2019 | Woodman | H04N 23/57 |

(Continued)

*Primary Examiner* — William R Alexander

(57)         ABSTRACT

A pair of glasses with an integrated computing device includes an eye glass frame, a tint adjustable left lens, a tint adjustable right lens, a computing device, a microphone, and a rechargeable battery. The eye glass frame includes a left lens frame, a right lens frame, a left temple, a right temple, and a bridge. The tint adjustable left lens is connected to the left lens frame. The tint adjustable right lens is connected to the right lens frame. The computing device, the microphone, and the rechargeable battery are integrated into the eye glass frame. The tint adjustable left lens, the tint adjustable right lens, the computing device, and the microphone are electrically connected to the rechargeable battery. The tint adjustable left lens, the tint adjustable right lens, and the microphone are electronically connected to the computing device.

10 Claims, 6 Drawing Sheets

(56) References Cited

U.S. PATENT DOCUMENTS

| 2021/0088810 A1 | 3/2021 | Adams | |
| 2022/0019083 A1* | 1/2022 | Woodman | .............. H04N 23/54 |
| 2024/0045117 A1* | 2/2024 | Li | ........................ G02B 26/007 |

* cited by examiner

PAIR OF GLASSES WITH INTEGRATED COMPUTING DEVICE

The current application claims a priority to the U.S. provisional patent application Ser. No. 63/368,465 filed on Jul. 14, 2022.

The current application is further a continuation-in-part (CIP) application of the U.S. design application Ser. No. 29/848,575 filed on Aug. 3, 2022.

The current application is further a CIP application of the U.S. design application Ser. No. 29/848,572 filed on Aug. 3, 2022.

FIELD OF THE INVENTION

The present invention relates generally to a pair of glasses with an integrated computing device. More specifically, the present invention is a wearable device that can monitor the surroundings of the wearer, display useful information to the wearer, and adjustable lens tint level according to the wearer's preference.

BACKGROUND OF THE INVENTION

Glasses have been used in a variety of situations for individuals to see better and additionally protect themselves from bright sunlight. Many of these glasses are designed as either sunglasses or glasses with a prescription lens installed. Unfortunately, many of these glasses are not capable of providing both features into one. Further, many sunglasses are designed with one standard level of tint and cannot be adjusted after purchase of the glasses, leaving the user limited to one level of darkness for the sunglasses. Furthermore, the standard type of glasses is not equipped with display monitors and smart features that all the user to communicate with a remote device and monitor the situation around them.

An objective of the present invention is to provide a pair of glasses with an integrated computing device. The present invention allows the user's to change the amount of tint on the lenses of glasses and display useful information. The present invention monitors the surrounding area so that visual information can be displayed on the lenses and audio information can be emitted through the earbuds. Furthermore, the present invention ensures that the wearer can obtain information while still being able to see in front of them. Resultantly, the present invention is able to provide smart capabilities that monitor the surroundings and provide the user with information within a pair of glasses.

SUMMARY OF THE INVENTION

The present invention is a pair of glasses with an integrated computing device that can utilize technology to present the user with information about their surroundings and connect with remote devices. The present invention can directly connect to the internet and utilize voice commands to gather any type of information. In order to access the mobile network, the present invention comprises a lens frame that provides the user with visual information that does not impair their vision. Further, the plurality of temples ensures the user can receive information through an audio means. Thus, the present invention is a pair of glasses with smart capabilities that monitor the surroundings and provide the user with information.

DETAIL DESCRIPTIONS OF THE INVENTION

Figure 1:
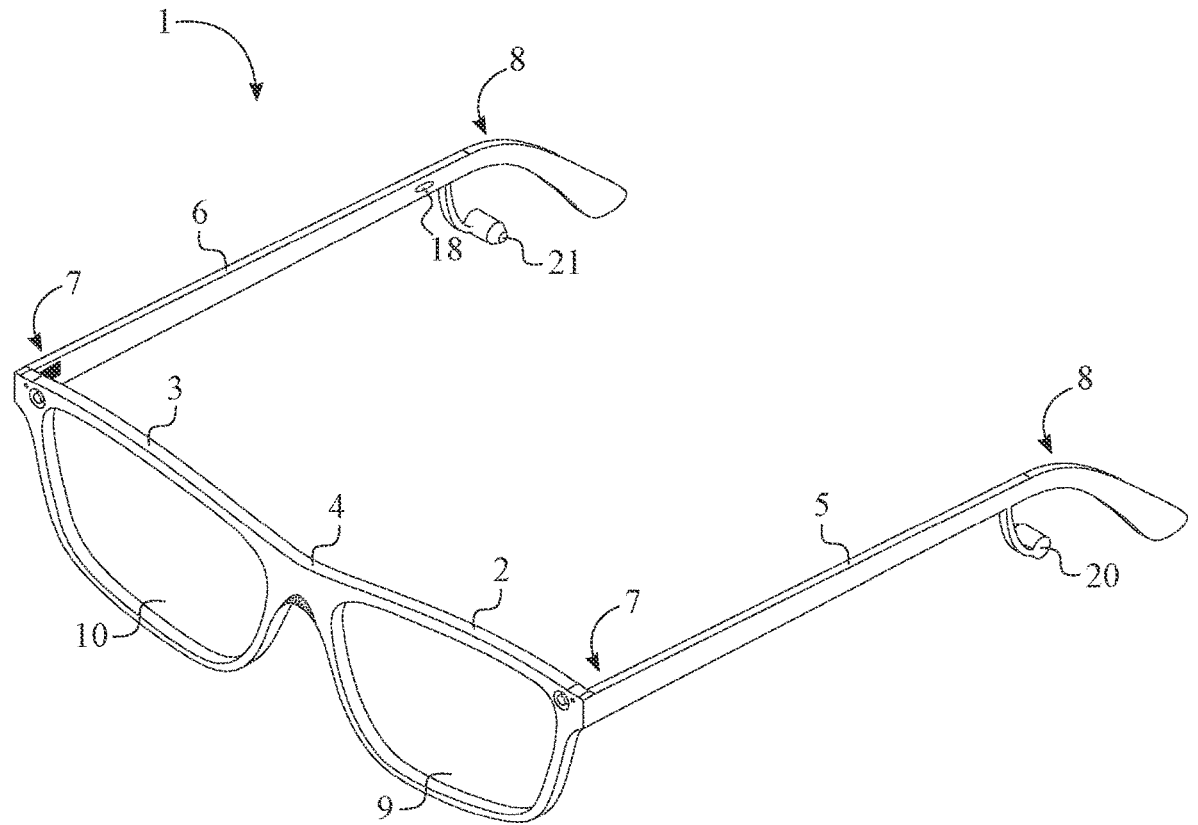
FIG. 1 is a top perspective view of the present invention.

All illustrations of the drawings are for the purpose of describing selected versions of the present invention and are not intended to limit the scope of the present invention.

The present invention is a pair of glasses with an integrated computing device 12 so that the present invention is able to provide users with information through audio and visual means. The present invention can wirelessly connect with an external electronic device or can operate independently from an external electronic device to process information from the surrounding environment or the user. The present invention comprises an eye glass frame 1, a tint adjustable left lens 9, a tint adjustable right lens 10, a computing device 12, a microphone 13, and a rechargeable battery 19 as shown in FIGS. 1-3.

Figure 2:
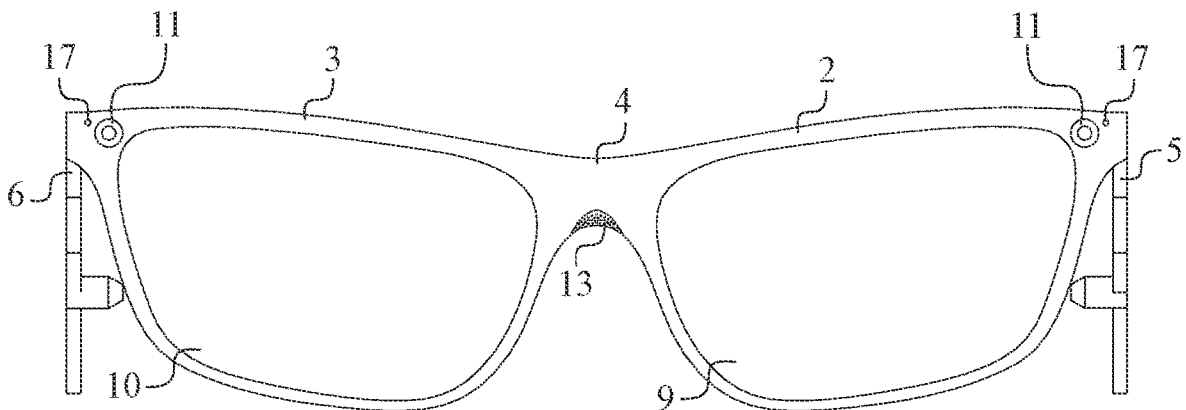
FIG. 2 is a front view of the present invention.
Figure 3:
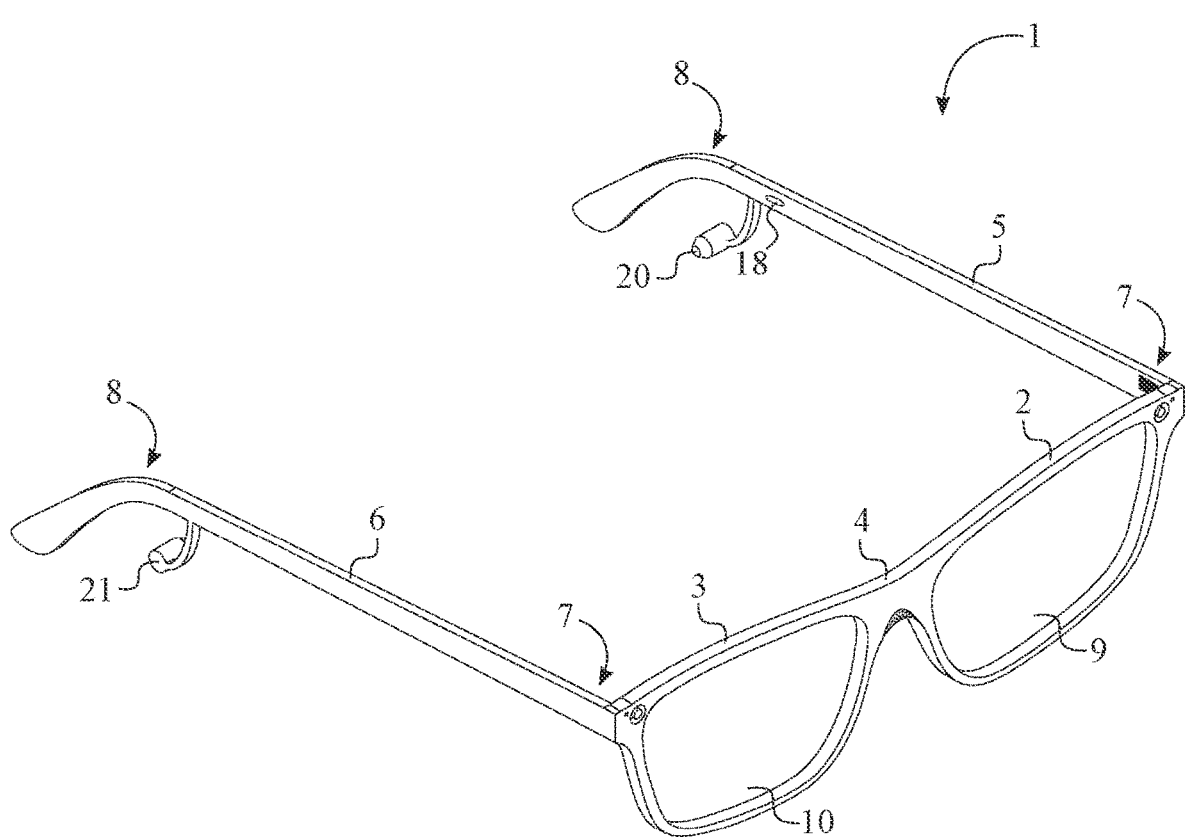
FIG. 3 is a top perspective view of the present invention.

In reference to FIGS. 1-3, the eye glass frame 1 is designed similar to existing eye glass wear and comprises a left lens frame 2, a right lens frame 3, a left temple 5, a right temple 6, and a bridge 4. More specifically, the left lens frame 2 is connected to the right lens frame 3 by the bridge 4 thus completing a front frame section. Resultantly, the tint adjustable left lens 9 is connected to the left lens frame 2. The tint adjustable right lens 10 is connected to the right lens frame 3. The left temple 5 and the right temple 6 function as the folding arms that secures the present invention to user's ears. The left temple 5 and the right temple 6 may each comprise a hinged end 7 and a free end 8 so that positioning of the left temple 5 and the right temple 6 can be explained. The left temple 5 and the bridge 4 are oppositely positioned of each other about the left lens frame 2 as the left temple 5 is hingedly connected to the left lens frame 2. In other words, the hinged end 7 of the left temple 5 is hingedly connected to the left lens frame 2 in such a way that the free end 8 of the left temple 5 is positioned offset from the left lens frame 2. The right temple 6 and the bridge 4 are positioned opposite of each other about the right lens frame 3 as the right temple 6 is hingedly connected to the right lens frame 3. In other words, the hinged end 7 of the right temple 6 is hingedly connected to the right lens frame 3 in such a way that the free end 8 of the right temple 6 is positioned offset from the left lens frame 2;

The tint adjustable left lens 9 and the tint adjustable right lens 10 are designed with a glass material thus allowing the user to control the percentage of tint. As a result, the user is able to adjust the visible light transmission through the tint adjustable left lens 9 and the tint adjustable right lens 10. Preferably, the tint adjustment of the present invention is initiated through user's voice commands. As shown in FIGS. 2-4, FIG. 5, and FIG. 6, the computing device 12, the microphone 13, and the rechargeable battery 19 are integrated into the eye glass frame 1 so that the user's voice commands can be executed. Preferably, the computing device 12 and the microphone 13 are integrated into the front frame section, and the rechargeable battery 19 is integrated into the left temple 5 and/or the right temple 6. However, the exact positioning of the computing device 12, the microphone 13, and the rechargeable battery 19 can vary upon the configuration of the present invention without deviating from the scope of the functionality. The microphone 13 is positioned in such a way that the microphone 13 is able to receive the user's commands or any other types of sounds from the surrounding environment. The tint adjustable left lens 9, the tint adjustable right lens 10, the computing device 12 and the microphone 13 being electrically connected to the rechargeable battery 19 so that the corresponding components can be electrically powered. In order to accomplish the tint adjustment within the present invention, the tint adjustable left lens 9, the tint adjustable right lens 10, and the microphone 13 are electronically connected to the computing device 12. For example, when the user's command is "change glasses to 50% tint", the microphone 13 relays the corresponding voice command to the computing device 12 that automatically adjusts the tint percentage of the tint adjustable left lens 9 and the tint adjustable right lens 10 to 50%. When the user's command is "change glasses to color red", the microphone 13 relays the corresponding voice command to the computing device 12 so that the computing device 12 can automatically adjust the tint percentage of the tint adjustable left lens 9 and the tint adjustable right lens 10 to red color. Furthermore, the tint adjustable left lens 9 and the tint adjustable right lens 10 are transparent display panels so that the present invention can display visual information to the user. Additionally, the tint adjustable left lens 9 and the tint adjustable right lens 10 are equipped with Ultraviolet (UV) protection thus shielding the user from harmful rays such as ultraviolet radiation. Furthermore, the tint adjustable left lens 9 and the tint adjustable right lens 10 can function as three-dimensional lenses to provide realistic information to the user.

Figure 5:
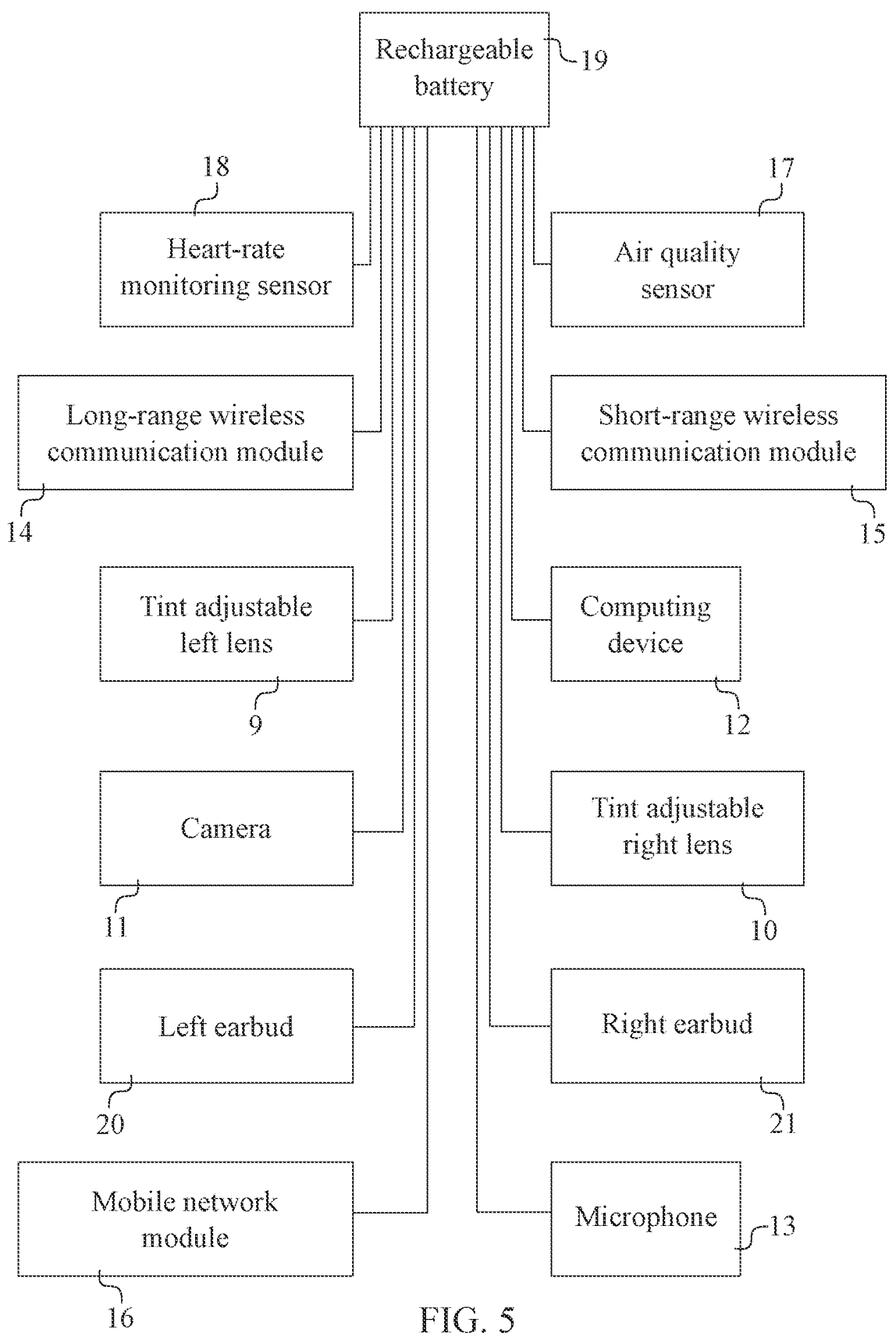
FIG. 5 is a schematic view showing the electrical connections of the present invention.
Figure 6:
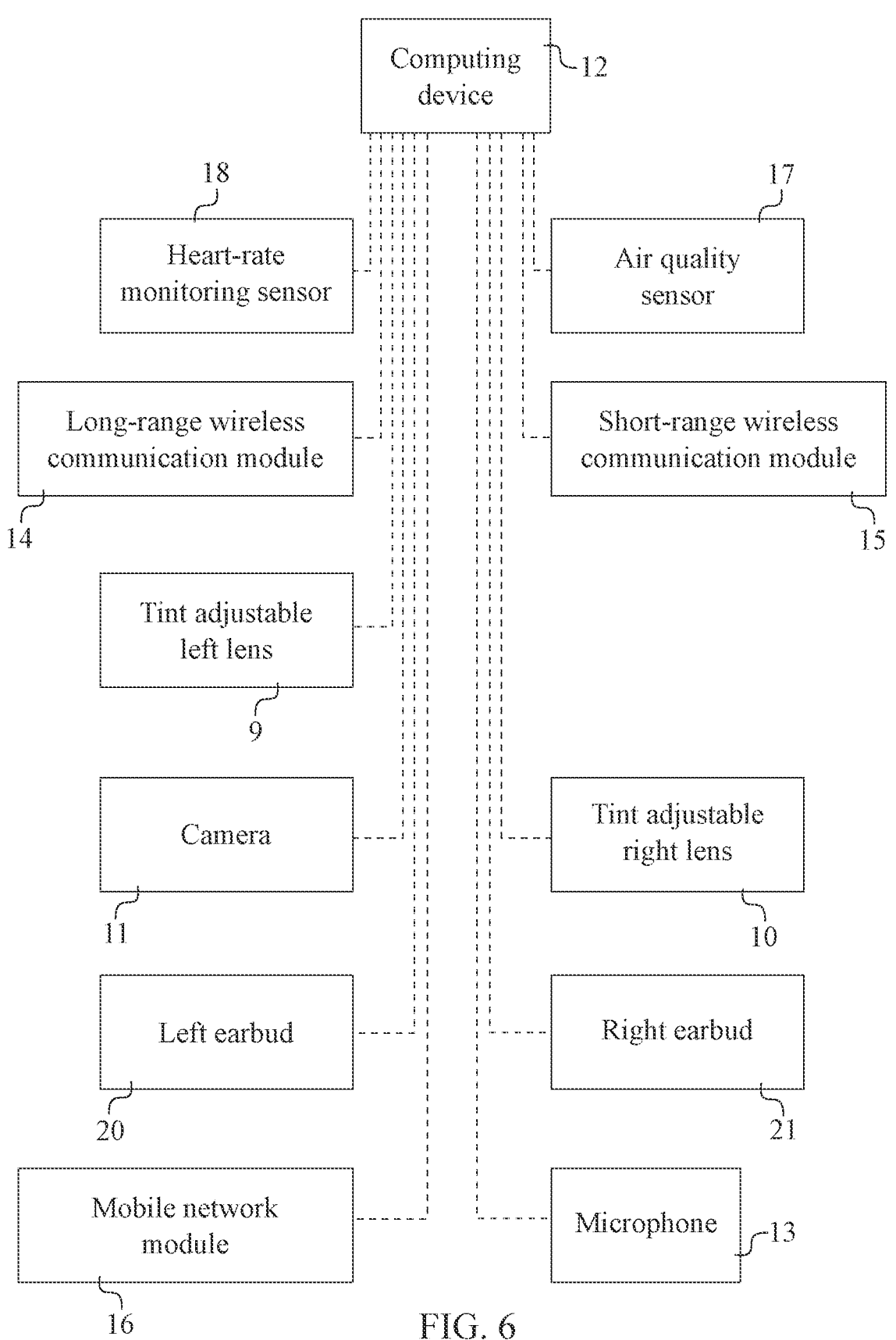
FIG. 6 is a schematic view showing the electronic connections of the present invention.

In reference to FIG. 1, FIG. 5, and FIG. 6, the present invention may further comprise a left earbud 20 and a right earbud 21. More specifically, the left earbud 20 adjustably connected to the free end 8 of the left temple 5 so that the present invention can relay audio information to the user's left ear. The right earbud 21 adjustably connected to the free end 8 of the right temple 6 so that the present invention can relay audio information to the user's right ear. Accordingly, the left earbud 20 and the right earbud 21 are electrically connected to the rechargeable battery 19 so that the left earbud 20 and the right earbud 21 can be electrically powered. The left earbud 20 and the right earbud 21 are electronically connected to the computing device 12, wherein the computing device 12 controls the outputting of the audio information according to the system preference and user inputs.

In reference to FIG. 2, FIG. 5, and FIG. 6, the present invention may further comprise at least one camera 11. The camera 11 is integrated into the eye glass frame 1 so that the camera 11 can take real time video and pictures. Preferably, the camera 11 is integrated into the front frame section so that the camera 11 is aligned with the user's sightline. The camera 11 can be a three-dimensional camera for augmented and virtual reality integration or a two-dimensional camera for video and pictures. The camera 11 is electrically connected to the rechargeable battery 19 so that the camera 11 can be electrically powered. The camera 11 is electronically connected to the computing device 12 to operate according to the user's preference and to process captured data. For example, when the user's command is "record", the microphone 13 relays the corresponding voice command to the computing device 12 so that the camera 11 can start the recoding process. Furthermore, the camera 11 and the computing device 12 can utilize the real time video to detect the surround so that the user can be warned. For example, the present invention can inform the user about an oncoming vehicle, "be careful, a car is approaching at the intersection" through the tint adjustable left lens 9 and/or the tint adjustable right lens 10 as visual information and through the left earbud 20 and the right earbud 21 as audio information. Furthermore, the camera 11 and the computing device 12 can utilize Artificial Intelligence (AI) technology to make suggestions and recommendations to enhance the user experience. Any suggestions and recommendations can then be displayed through the tint adjustable left lens 9 and/or the tint adjustable right lens 10 as visual information and release through the left earbud 20 and the right earbud 21 as audio information.

Figure 4:
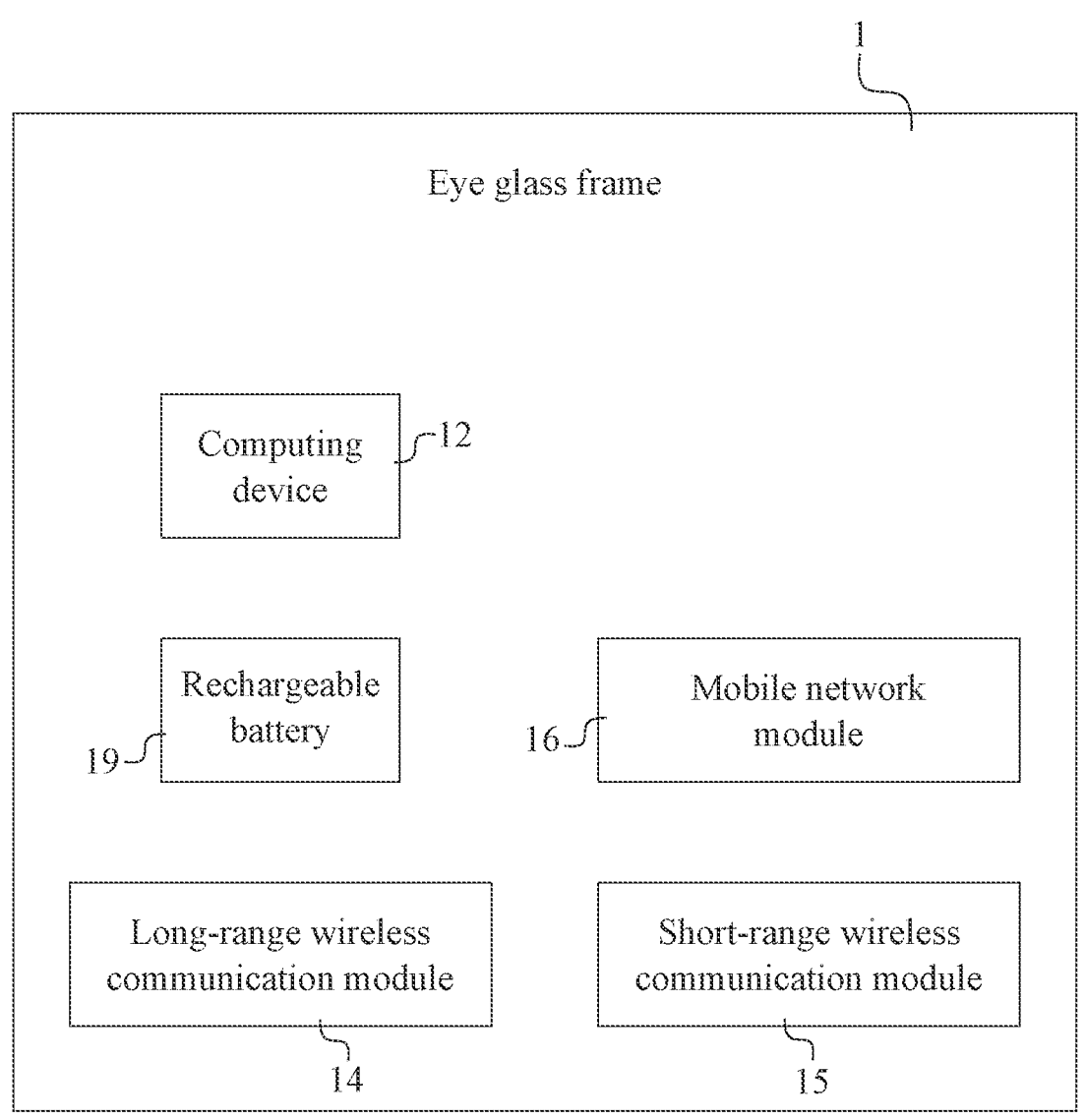
FIG. 4 is a schematic view showing the internally positioned components within the eye glass frame.

In reference to FIG. 4, FIG. 5, and FIG. 6, the present invention may further comprise a long-range wireless communication module 14. The long-range wireless communication module 14 is utilized to access the internet through a wireless router so that the present invention is able to exchange data. The long-range wireless communication module 14 is integrated into the eye glass frame 1, preferably within the left temple 5 or the right temple 6. The long-range wireless communication module 14 is electrically connected to the rechargeable battery 19 so that the long-range wireless communication module 14 can be electrically powered. The long-range wireless communication module 14 is electronically connected to the computing device 12 so that the computing device 12 is able to operate the long-range wireless communication module 14 according to the user's inputs. For example, the user can utilize voice commands to find information on the internet that is then relayed directly to the present invention and to the user through the tint adjustable left lens 9 and/or the tint adjustable right lens 10 as visual information and through the left earbud 20 and the right earbud 21 as audio information.

In reference to FIG. 4, FIG. 5, and FIG. 6, the present invention may further comprise a short-range wireless communication module 15. The short-range wireless communication module 15 is utilized to communicate with multiple electronic devices so that the present invention is able to exchange data. For example, the present invention utilizes the short-range wireless communication module 15 to communicate with a smartphone, smart speakers, laptops, electronic tablets, smart watches, or any other types of similar electronic devices. The short-range wireless communication module 15 is integrated into the eye glass frame 1, preferably within the left temple 5 or the right temple 6. The short-range wireless communication module 15 is electrically connected to the rechargeable battery 19 so that the short-range wireless communication module 15 can be electrically powered. The short-range wireless communication module 15 is electronically connected to the computing device 12 so that the computing device 12 is able to operate the short-range wireless communication module 15 according to the user's inputs. When the present invention is paired with a smartphone through the short-range wireless communication module 15, any visual information (such as time, weather, messages, music, and notifications) from the smartphone can be displayed within the tint adjustable left lens 9 and/or the tint adjustable right lens 10. For example, when the smartphone is communicably coupled with the present invention via the short-range wireless communication module 15, the user can utilize voice commands to display incoming massages of the smartphone onto the tint adjustable left lens 9 and/or the tint adjustable right lens 10 or to hear incoming messages through the left earbud 20 and the right earbud 21.

In reference to FIG. 4, FIG. 5, and FIG. 6, the present invention may further comprise a mobile network module 16 so that the present invention is able to directly connect with the internet. The mobile network module 16 is integrated into the eye glass frame 1, preferably within the front frame section. The mobile network module 16 is electrically connected to the rechargeable battery 19 so that the mobile network module 16 can be electrically powered. The mobile network module 16 is electronically connected to the computing device 12 thus allowing the computing device 12 to operate the mobile network module 16 according to the user's inputs.

In reference to FIG. 2, FIG. 5, and FIG. 6, the present invention may further comprise at least one air quality sensor 17. The air quality sensor 17 is designed to gather information of the surrounding air quality such as allergens, temperature, humidity, and other air factors that are useful to the user. The air quality sensor 17 is integrated into the eye glass frame 1, preferably within the front frame section for optimal placement. This information is then relayed to the user as visual information via the tint adjustable left lens 9 and/or the tint adjustable right lens 10 and/or as audio information via the left earbud 20 and the right earbud 21. The air quality sensor 17 is electrically connected to the rechargeable battery 19 so that the air quality sensor 17 can be electrically powered. The air quality sensor 17 is electronically connected to the computing device 12 so that measured readings from the air quality sensor 17 can be transferred to the computing device 12. As a result, the user can utilize voice commands to display the measured readings onto the tint adjustable left lens 9 and/or the tint adjustable right lens 10 or to hear measured readings through the left earbud 20 and the right earbud 21.

In reference to FIG. 1, FIG. 3, FIG. 5, and FIG. 6, the present invention may further comprise at least one heart-rate monitoring sensor 18. The heart-rate monitoring sensor 18 is designed to gather the user's heart rate. The heart-rate monitoring sensor 18 is integrated into the eye glass frame 1. Preferably the heart-rate monitoring sensor 18 is integrated into the free end 8 of the left temple 5 and/or the free end 8 of the right temple 6 to reach blood vessels near user's ears. This information is then relayed to the user as visual information via the tint adjustable left lens 9 and/or the tint adjustable right lens 10 and/or as audio information via the left earbud 20 and the right earbud 21. The heart-rate monitoring sensor 18 is electrically connected to the rechargeable battery 19 so that the heart-rate monitoring sensor 18 can be electrically powered. The heart-rate monitoring sensor 18 is electronically connected to the computing device 12 so that measured readings from the heart-rate monitoring sensor 18 can be transferred to the computing device 12. As a result, the user can utilize voice commands to display the measured readings onto the tint adjustable left lens 9 and/or the tint adjustable right lens 10 or to hear measured readings through the left earbud 20 and the right earbud 21.

The present invention can be identified as an independent electronic device when the computing device 12 is able to fully execute all of the abovementioned functionalities and directly connected to the internet via the mobile network module 16 or the long-range wireless communication module 14. The present invention can be identified as a dependent electronic device when the computing device 12 is able to fully execute all of the abovementioned functionalities and connected to the internet through an intermediate electronic device such as a computer, smartphone, or electronic tables, wherein the intermediate electronic device is communicably coupled to the present invention via the short-range wireless communication module 15.

Although the invention has been explained in relation to its preferred embodiment, it is to be understood that many other possible modifications and variations can be made without departing from the spirit and scope of the invention as hereinafter claimed.

What is claimed is:

1. A pair of glasses with an integrated computing device comprising:

an eye glass frame;

a tint adjustable left lens;

a tint adjustable right lens;

a computing device;

a microphone;

a rechargeable battery;

a left transparent display panel;

a right transparent display panel;

at least one heart-rate monitoring sensor;

a left camera;

a right camera;

the eye glass frame comprising a left lens frame, a right lens frame, a left temple, a right temple, and a bridge;

the tint adjustable left lens being connected to the left lens frame;

the tint adjustable right lens being connected to the right lens frame;

the computing device, the microphone, the rechargeable battery, and the heart-rate monitoring sensor being integrated into the eye glass frame;

the microphone being integrated into a skin-bracing surface of the bridge;

the heart-rate monitoring sensor being positioned offset from the tint adjustable left lens and the tint adjustable right lens;

the left camera being integrated into the left lens frame, adjacent to the left temple;

the right camera being integrated into the right lens frame, adjacent to the right temple;

the tint adjustable left lens, the tint adjustable right lens, the computing device, the microphone, the heart-rate monitor, the left transparent display panel, the right transparent display panel, the left camera, and the right camera being electrically connected to the rechargeable battery;

the tint adjustable left lens, the tint adjustable right lens, the microphone, the heart-rate monitor, the left transparent display panel, the right transparent display panel, the left camera, and the right camera being electronically connected to the computing device;

the left transparent display panel being operatively integrated into the tint adjustable left lens, wherein the left transparent display panel is used to display information across the tint-adjustable left lens;

the right transparent display panel being operatively integrated into the tint adjustable right lens, wherein the right transparent display panel is used to display information across the tint-adjustable right lens;

the left camera being a two-dimensional camera configured to capture pictures and videos;

the right camera being a three-dimensional camera configured to capture augmented- and virtual-reality integration; and the microphone and the computing device being configured in tandem to receive and execute voice commands from the tint adjustable left lens, the tint adjustable right lens, the heart-rate monitor, the left transparent display panel, the right transparent display panel, the left camera, and the right camera.

2. The pair of glasses with an integrated computing device as claimed in claim 1 comprising:

the left lens frame being connected to the right lens frame by the bridge;

the left temple and the bridge being oppositely positioned of each other about the left lens frame;

the left temple being hingedly connected to the left lens frame;

the right temple and the bridge being oppositely positioned of each other about the right lens frame; and the right temple being hingedly connected to the right lens frame.

3. The pair of glasses with an integrated computing device as claimed in claim 2 comprising:

the left temple and the right temple each comprising a hinged end and a free end;

the hinged end of the left temple being hingedly connected to the left lens frame;

the free end of the left temple being positioned offset from the left lens frame;

the hinged end of the right temple being hingedly connected to the right lens frame; and the free end of the right temple being positioned offset from the right lens frame.

4. The pair of glasses with an integrated computing device as claimed in claim 1 comprising:

a left earbud;

a right earbud;

the left earbud adjustably connected to a free end of the left temple;

the right earbud adjustably connected to a free end of the right temple;

the left earbud and the right earbud being electrically connected to the rechargeable battery; and the left earbud and the right earbud being electronically connected to the computing device.

5. The pair of glasses with an integrated computing device as claimed in claim 1 comprising:

a long-range wireless communication module;

the long-range wireless communication module being integrated into the eye glass frame;

the long-range wireless communication module being electrically connected to the rechargeable battery; and the long-range wireless communication module being electronically connected to the computing device.

6. The pair of glasses with an integrated computing device as claimed in claim 1 comprising:

a short-range wireless communication module;

the short-range wireless communication module being integrated into the eye glass frame;

the short-range wireless communication module being electrically connected to the rechargeable battery; and the short-range wireless communication module being electronically connected to the computing device.

7. The pair of glasses with an integrated computing device as claimed in claim 1 comprising:

a mobile network module;

the mobile network module being integrated into the eye glass frame;

the mobile network module being electrically connected to the rechargeable battery; and the mobile network module being electronically connected to the computing device.

8. The pair of glasses with an integrated computing device as claimed in claim 1 comprising:

at least one air quality sensor;

the air quality sensor being integrated into the eye glass frame;

the air quality sensor being electrically connected to the rechargeable battery; and the air quality sensor being electronically connected to the computing device.

9. The pair of glasses with an integrated computing device as claimed in claim 1, wherein the heart-rate monitoring sensor is integrated into a free end of the left temple.

10. The pair of glasses with an integrated computing device as claimed in claim 1, wherein the heart-rate monitoring sensor is integrated into a free end of the right temple.

* * * * *